(12) United States Patent
Feltham

(10) Patent No.: US 9,897,121 B1
(45) Date of Patent: Feb. 20, 2018

(54) AUTOMOTIVE AIR INTAKE UTILIZING A VORTEX GENERATING AIRFLOW SYSTEM

(71) Applicant: Atieva, Inc., Menlo Park, CA (US)

(72) Inventor: Graham Lloyd Feltham, Menlo Park, CA (US)

(73) Assignee: ATIEVA, INC., Menlo Park, CA (US)

( * ) Notice: Subject to any disclaimer, the term of this patent is extended or adjusted under 35 U.S.C. 154(b) by 0 days.

(21) Appl. No.: 15/278,266

(22) Filed: Sep. 28, 2016

(51) Int. Cl.
| | |
|---|---|
| *F15C 1/16* | (2006.01) |
| *F15D 1/00* | (2006.01) |
| *B60H 1/00* | (2006.01) |
| *F28F 13/08* | (2006.01) |
| *F01M 5/00* | (2006.01) |
| *F01P 11/10* | (2006.01) |

(52) U.S. Cl.
CPC ......... *F15D 1/009* (2013.01); *B60H 1/00564* (2013.01); *F01M 5/002* (2013.01); *F01P 11/10* (2013.01); *F28F 13/08* (2013.01)

(58) Field of Classification Search
CPC ......... Y10T 137/2087; Y10T 137/2093; Y10T 137/2098; Y10T 137/2104; Y10T 137/2109; F15D 1/009; F01M 5/002; B60H 1/00564; F28F 13/08; F01P 11/10
USPC ....... 137/808, 809, 810, 811, 812, 340, 338, 137/899, 351, 355; 165/41, 104.34, 144, 165/917
See application file for complete search history.

(56) References Cited

U.S. PATENT DOCUMENTS

| | | | | |
|---|---|---|---|---|
| 3,195,303 | A * | 7/1965 | Widell | F02K 9/805 137/813 |
| 3,236,298 | A * | 2/1966 | Nikolaus | F01K 9/003 165/124 |
| 3,474,670 | A * | 10/1969 | Rupert | F15C 1/16 137/812 |
| 3,494,372 | A * | 2/1970 | Kiwak | F15C 1/16 137/812 |
| 3,521,657 | A * | 7/1970 | Ayers | F15C 1/16 137/813 |
| 3,545,468 | A * | 12/1970 | Bean | F15C 1/003 137/805 |
| 3,578,013 | A * | 5/1971 | Brochard | F15C 1/16 137/804 |
| 3,608,571 | A * | 9/1971 | Wilcox | F15C 1/16 137/809 |
| 3,696,730 | A * | 10/1972 | Masuda | F01P 5/06 180/68.1 |
| 4,206,783 | A * | 6/1980 | Brombach | E03F 5/106 137/808 |
| 4,518,013 | A * | 5/1985 | Lazarus | A01G 25/16 137/810 |
| 4,679,595 | A * | 7/1987 | Johannessen | E03F 5/106 137/556.6 |

(Continued)

*Primary Examiner* — Minh Le
(74) *Attorney, Agent, or Firm* — Patent Law Office of David G. Beck

(57) ABSTRACT

An airflow system is provided that utilizes a vortex generator to efficiently draw ambient air into one or more automotive heat exchangers. Due to the use of the vortex generator, the air intake may be much smaller than that used in a conventional system and may have a significantly different aspect ratio from that of the heat exchanger, thus providing additional vehicle design flexibility. The vortex generator may use a single outlet or multiple outlets, and may be coupled directly or via a transition duct(s) to the heat exchanger(s).

29 Claims, 13 Drawing Sheets

(56) References Cited

U.S. PATENT DOCUMENTS

| | | | | |
|---|---|---|---|---|
| 4,817,863 A * | 4/1989 | Bragg | | F24F 13/08 137/805 |
| 4,846,224 A * | 7/1989 | Collins, Jr. | | F15C 1/16 137/810 |
| 4,889,166 A * | 12/1989 | Lakatos | | E03F 5/106 137/810 |
| 5,080,137 A * | 1/1992 | Adams | | E03F 5/106 137/315.01 |
| 5,337,789 A * | 8/1994 | Cook | | E03F 5/106 137/810 |
| 5,495,909 A * | 3/1996 | Charles | | B60H 1/3227 123/41.66 |
| 5,524,393 A * | 6/1996 | Nill | | E04D 13/0409 405/52 |
| 5,913,334 A * | 6/1999 | Hyun | | B04C 5/12 137/810 |
| 5,971,023 A * | 10/1999 | Clague | | A61M 39/10 137/811 |
| 6,142,213 A * | 11/2000 | Gallivan | | F01P 11/10 123/41.49 |
| 6,374,858 B1 * | 4/2002 | Hides | | E03F 5/106 137/315.11 |
| 7,261,008 B2 * | 8/2007 | Saaski | | G01N 1/2273 73/863.22 |
| 7,537,072 B2 * | 5/2009 | Sturmon | | B60K 11/08 165/51 |
| 7,595,487 B2 * | 9/2009 | Fedorov | | H01J 49/066 137/808 |
| 8,267,209 B2 * | 9/2012 | Kuwabara | | B60K 11/04 123/41.48 |
| 8,479,853 B2 * | 7/2013 | Verbrugge | | B62D 25/12 180/68.2 |
| 8,555,924 B2 * | 10/2013 | Faram | | E03F 5/106 137/812 |
| 8,905,144 B2 * | 12/2014 | Dykstra | | E21B 34/06 137/808 |
| 8,919,300 B2 * | 12/2014 | Klinkert | | B60K 11/08 123/41.58 |
| 8,978,628 B2 * | 3/2015 | Reynolds | | F01P 3/00 123/41.02 |
| 8,985,150 B2 * | 3/2015 | Fripp | | F15D 1/0015 137/599.01 |
| 8,997,846 B2 * | 4/2015 | Kucherov | | F28F 3/04 165/109.1 |
| 2007/0028977 A1 * | 2/2007 | Goulet | | F15C 1/16 137/809 |
| 2007/0261816 A1 * | 11/2007 | Warren | | B60K 11/04 165/41 |
| 2014/0090800 A1 * | 4/2014 | Dossner | | F01P 3/20 165/41 |
| 2015/0361237 A1 * | 12/2015 | Kim | | C08J 9/0061 454/69 |
| 2016/0272257 A1 * | 9/2016 | McKillen | | B62D 35/005 |

* cited by examiner

AUTOMOTIVE AIR INTAKE UTILIZING A VORTEX GENERATING AIRFLOW SYSTEM

FIELD OF THE INVENTION

The present invention relates generally to vehicles and, more particularly, to an air intake system.

BACKGROUND OF THE INVENTION

Achieving adequate air flow is essential to the operation of most modern vehicles, even those vehicles that do not utilize combustion engines, due to their reliance on heat exchangers. In general air, which is brought into the car via one or more air intakes, passes through one or more heat exchangers where the heat that has been generated by the various vehicle subsystems is transferred to the ambient environment. Depending upon the car's design, the air intake(s) as well as the heat exchanger(s) may be mounted in any of a variety of locations throughout the car, although typically the primary heat exchanger(s) is mounted at or near the front of the car where the primary air intake(s) is generally located. Common alternative air intake locations include the area between the rear of the hood and the windshield; behind the passenger cabin, e.g., the rear deck; and in front of either the front or rear wheel wells. The selection of the mounting locations for the various heat exchangers is often driven by vehicle packaging constraints as well as proximity to the heat source, i.e., engine/motor, battery pack, power electronics, transmission, etc. The heat exchanger(s) may be mounted directly behind the corresponding air intake, or located remotely from the intake and coupled together via ducting.

While the term "heat exchanger" refers to any type of device that transfers heat from one medium to another medium, vehicles predominantly use heat exchangers that transfer heat from a fluid, such as a coolant or a refrigerant, to air. The efficiency and performance of such a heat exchanger is primarily dependent upon the size of the heat exchanger, specifically the surface area of the heat exchanger, and the flow rate of each of the two mediums, i.e., the flow rate of the coolant/refrigerant as well as that of the air.

In order to achieve a high air flow rate as well as uniform flow distribution, a conventional vehicle utilizes an air intake that is of approximately the same size as that of the heat exchanger. Additionally, since most heat exchangers have an aspect ratio (i.e., height to width) that is in the range of 1:1 to 1:2 in order to provide a large surface area, the aspect ratio of the air intake in such a vehicle is also typically in this same range, i.e., 1:1-1:2. FIGS. 1 and 2 illustrate typical air intake configurations. Vehicles 100 and 200 utilize a heat exchanger 101 (e.g., dashed lines) with an aspect ratio of approximately 1:2. Air intake 103 is of approximately the same size and aspect ratio as heat exchanger 101, although intake 103 is shaped, e.g., rounded corners, for cosmetic and/or aerodynamic reasons. While vehicle 200 utilizes a pair of intakes 201 and 203, these two intakes are coupled to a single heat exchanger, i.e., heat exchanger 101, and perform as a single air intake system. FIG. 3 illustrates an alternate conventional air intake configuration. In this design a pair of smaller heat exchangers 301/302 is coupled via ducting 305 to a single air intake 303. Air intake 303 may or may not include a partition 307 that forcibly separates intake air into two air streams, one for either heat exchanger. In this configuration, the surface area of intake 303 is approximately equal to the combined surface areas of heat exchangers 301 and 302.

While the various air intake configurations used in conventional vehicles provide adequate air flow, given the limited aspect ratio range as well as the need to have an air intake of approximately the same size as the corresponding heat exchanger, the available options for possible intake designs is quite limited. This, in turn, limits the overall vehicle design, both in terms of cosmetics and vehicle aerodynamics. Accordingly, what is needed is an air intake system that provides the performance of a conventional intake without having the design limitations imposed by a conventional design. The present invention provides such an air intake system.

SUMMARY OF THE INVENTION

The present invention provides an airflow system that utilizes a vortex generator to efficiently draw ambient air into at least one automotive heat exchanger. The vortex generator is comprised of an elongated duct, a primary inlet and at least one outlet, where the elongated duct defines an axial centerline. A first outlet of said at least one outlet corresponds to a first end of the elongated duct. The primary inlet is elongated and defined by a primary inlet length and a primary inlet height, where a first axis corresponding to the primary inlet length is parallel with the axial centerline of the vortex generator. Ambient air flows into the vortex generator through the primary inlet and then flows out of the vortex generator through the at least one outlet and into the at least one automotive heat exchanger.

In one aspect of the airflow system, the cross-sectional area corresponding to the total cross-sectional area of the at least one outlet is at least 3 times larger than the cross-sectional area of the primary inlet; preferably the cross-sectional area corresponding to the total cross-sectional area of the at least one outlet is at least 4 times larger than the cross-sectional area of the primary inlet; more preferably the cross-sectional area corresponding to the total cross-sectional area of the at least one outlet is at least 5 times larger than the cross-sectional area of the primary inlet; and still more preferably the cross-sectional area corresponding to the total cross-sectional area of the at least one outlet is at least 6 times larger than the cross-sectional area of the primary inlet.

In another aspect of the airflow system, the aspect ratio corresponding to the primary inlet and defined as the ratio of the primary inlet length to the primary inlet height is at least 4:1; preferably at least 8:1; more preferably at least 12:1; and yet still more preferably at least 16:1.

In another aspect of the airflow system, the aspect ratio corresponding to each outlet of the at least one outlet is in the range of 1:1 to 1:2, where the aspect ratio is defined as the ratio of the outlet width to the outlet height.

In another aspect of the airflow system, the first aspect ratio corresponding to each outlet of the at least one outlet relative to the second aspect ratio corresponding to each heat exchanger of the at least one heat exchanger is in the range of 1:1 to 1:2, where the first aspect ratio is defined as the ratio of the outlet width to the outlet height, and where the second aspect ratio is defined as the ratio of the heat exchanger width to the heat exchanger height.

In another aspect of the airflow system, the average ratio of the primary inlet height to the outlet height is 0.5 or less.

In another aspect of the airflow system, the vortex generator is further comprised of a secondary inlet aligned with the axial centerline, where ambient air passing through the secondary inlet is injected directly into the core of the vortex generator.

In another aspect of the airflow system, the primary inlet is coupled to the elongated duct along an upper surface of the elongated duct; alternately, the primary inlet is coupled to the elongated duct along a lower surface of the elongated duct.

In another aspect of the airflow system, the ratio of the primary inlet length to the elongated duct length is at least 0.25; more preferably at least 0.50; and yet still more preferably at least 0.75.

In another aspect of the airflow system, the elongated duct comprising the vortex generator may have a conic cross-section (e.g., a circular or elliptical cross-section); alternately, the cross-section of the elongated duct may be defined by the involute of a conic.

In another aspect of the airflow system, the cross-section of the elongated duct of the vortex generator is uniform throughout the elongated duct. The vortex generator may further comprise a second outlet, where the second outlet corresponds to the second end of the elongated duct, where the first outlet is distal from the second outlet, where the ambient air flows into the vortex generator through the primary inlet, and where the ambient air flows out of the vortex generator through the first outlet and into a first heat exchanger of the at least one automotive heat exchanger and flows out of the vortex generator through the second outlet and into a second heat exchanger of the at least one automotive heat exchanger.

In another aspect of the airflow system, the cross-section of the elongated duct of the vortex generator is non-uniform throughout the elongated duct. The second end of the elongated duct, distal from the first outlet, may be closed and have a cross-sectional area that is smaller than the cross-sectional area of the first outlet. Preferably the rate of growth between the cross-sectional area of the closed end and the cross-sectional area of the first outlet is $3.6r$ mm$^2$/mm or less, where r equals the radius of the first outlet.

In another aspect of the airflow system, the cross-section of the elongated duct of the vortex generator is non-uniform throughout the elongated duct. The second end of the elongated duct, distal from the first outlet, may be comprised of a second outlet such that ambient air flowing into the vortex generator through the primary inlet flows out of the vortex generator through the first outlet and into a first heat exchanger of the at least one automotive heat exchanger and flows out of the second outlet and into a second heat exchanger of the at least one automotive heat exchanger. Preferably the cross-sectional area of the elongated duct midway between the first outlet and the second outlet is smaller than the cross-sectional area corresponding to the outlet and corresponding to the second outlet.

The vortex generator may further comprise a second outlet, where the second outlet corresponds to the second end of the elongated duct, where the first outlet is distal from the second outlet, where the ambient air flows into the vortex generator through the primary inlet, and where the ambient air flows out of the vortex generator through the first outlet and into a first heat exchanger of the at least one automotive heat exchanger and flows out of the vortex generator through the second outlet and into a second heat exchanger of the at least one automotive heat exchanger.

In another aspect of the airflow system, the system further includes at least one transition duct that couples the at least one outlet of the vortex generator to the at least one heat exchanger.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, steps, operations, elements, and/or components, but do not preclude the presence or addition of one or more other features, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, and, similarly, a first step could be termed a second step, without departing from the scope of this disclosure.

In the following text, the terms "air inlet" and "air intake" may be used interchangeably. The term "heat exchanger" as used herein refers to a device such as a radiator, oil cooler, evaporator, condenser, etc. that transfers heat from one medium to another, where one of the mediums is air. The other medium may consist of water, water with an additive such as ethylene glycol, oil, refrigerant, or other heat transfer medium.

Figure 1:
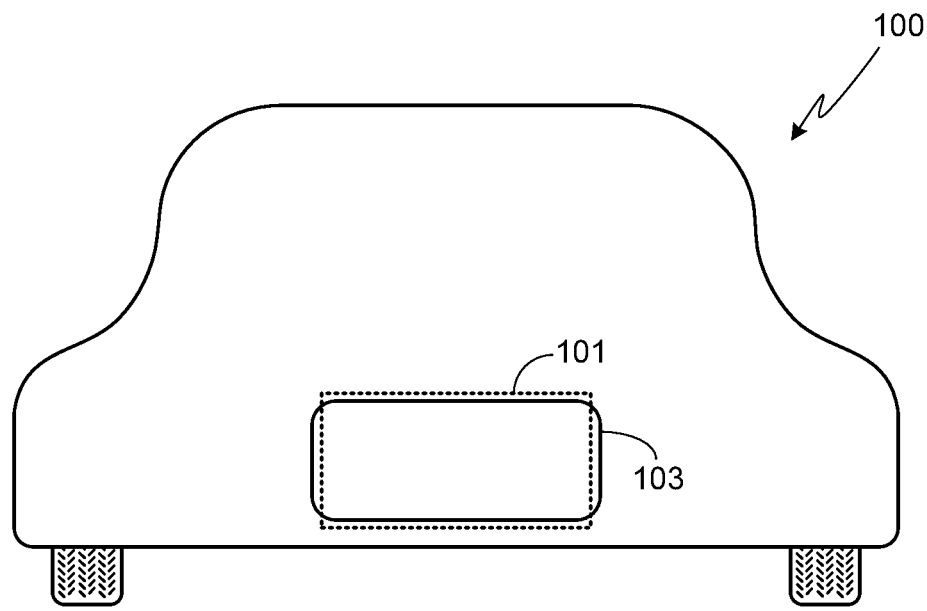
FIG. 1 provides a simplified view of the front portion of a vehicle, this view illustrating the air intake of a conventional vehicle.
Figure 2:
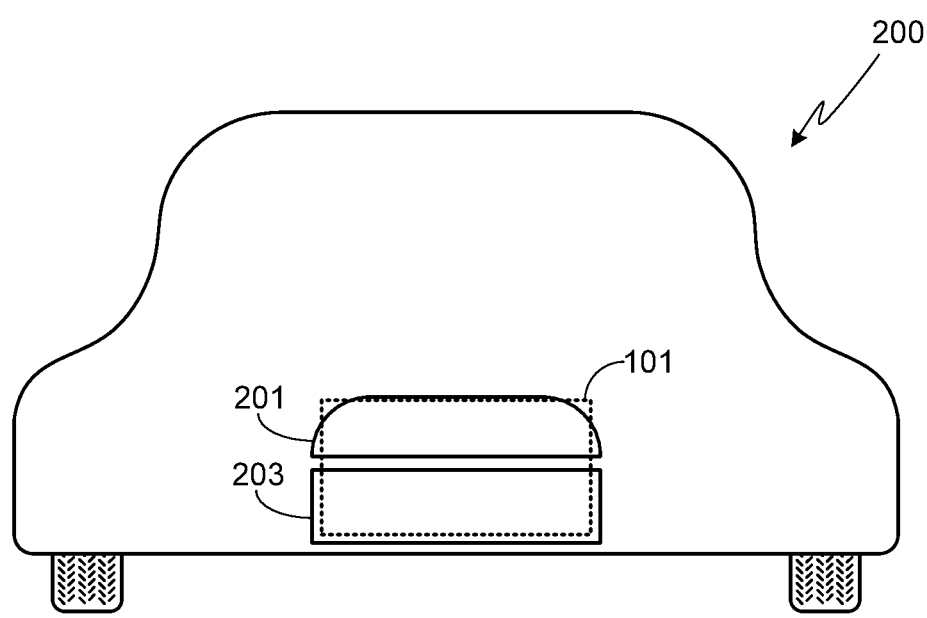
FIG. 2 provides a simplified view of the front portion of a vehicle, this view illustrating an alternate air intake configuration for a conventional vehicle.
Figure 3:
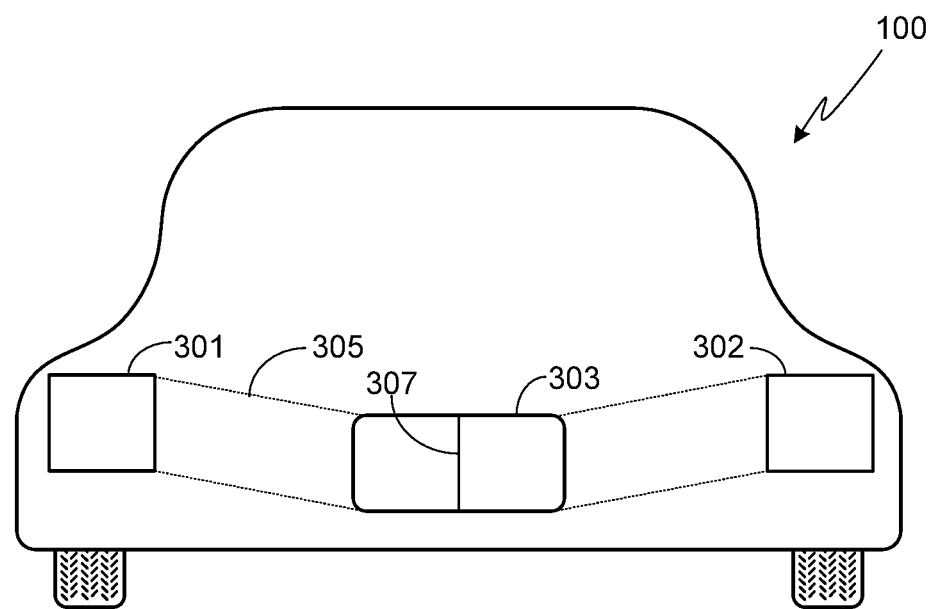
FIG. 3 provides a simplified view of the front portion of a vehicle, this view illustrating an alternate air intake configuration for a conventional vehicle.
Figure 4:
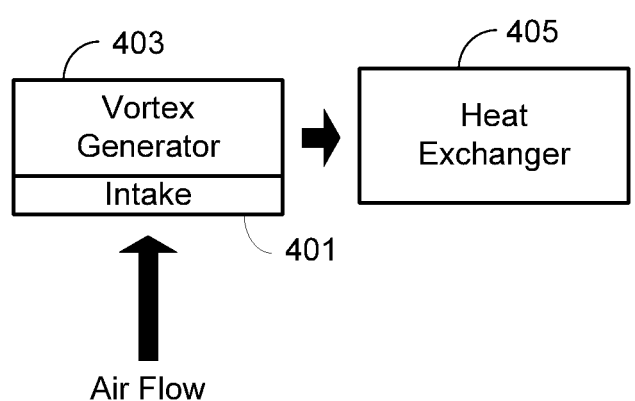
FIG. 4 schematically illustrates an embodiment of the invention in which the heat exchanger is mounted next to the outlet of the vortex generator.
Figure 5:
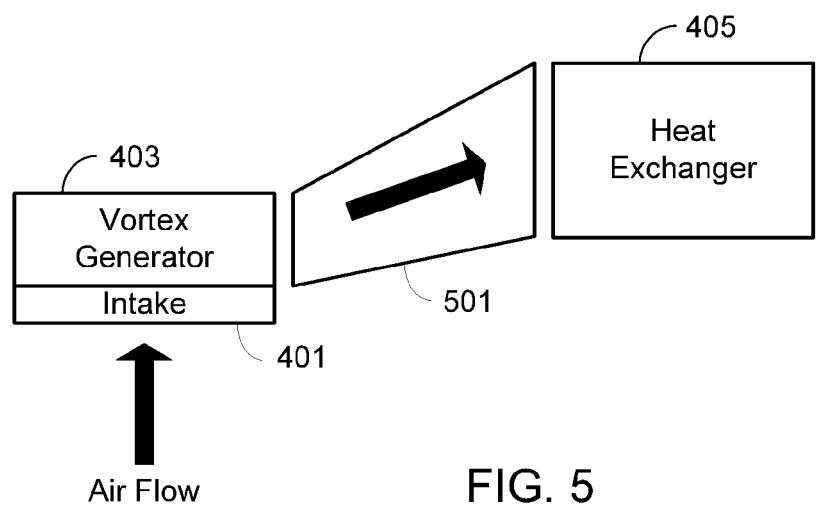
FIG. 5 schematically illustrates an alternate embodiment of the invention in which a transition duct is interposed between the outlet of the vortex generator and the inlet of the heat exchanger.
Figure 6:
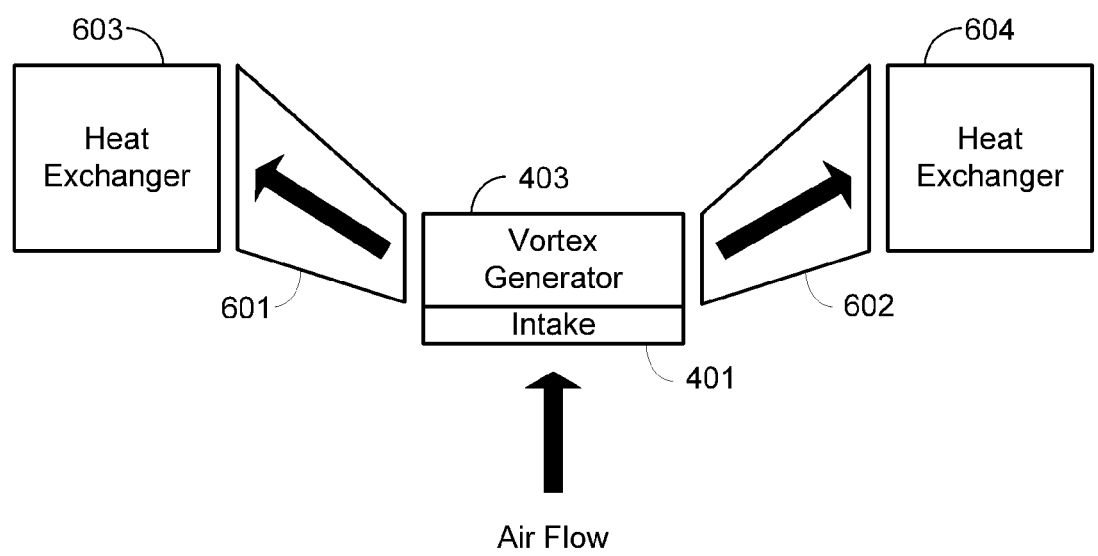
FIG. 6 schematically illustrates an alternate embodiment of the invention in which a pair of heat exchangers is coupled to a single vortex generator by a pair of transition ducts.

In accordance with the invention, and as illustrated in FIG. 4, air flowing into the air intake 401 flows through a vortex generator 403 prior to passing through the heat exchanger 405. If desired, and as illustrated in FIG. 5, the air flowing out of vortex generator 403 may pass through a transition duct 501, thus providing greater flexibility in terms of the orientation, mounting location, size and shape of the heat exchanger 405 relative to the vortex generator. Additionally, and as illustrated in FIG. 6, the air flowing out of the vortex generator may pass through multiple transition ducts 601/602 and feed multiple heat exchangers 603/604.

Figure 7:
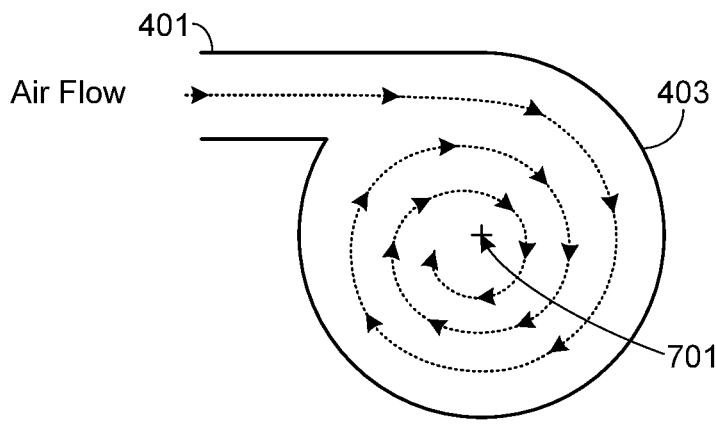
FIG. 7 illustrates a circular cross-sectional shape for a vortex generator in accordance with the invention, where the air intake is located at the top of the generator.
Figure 8:
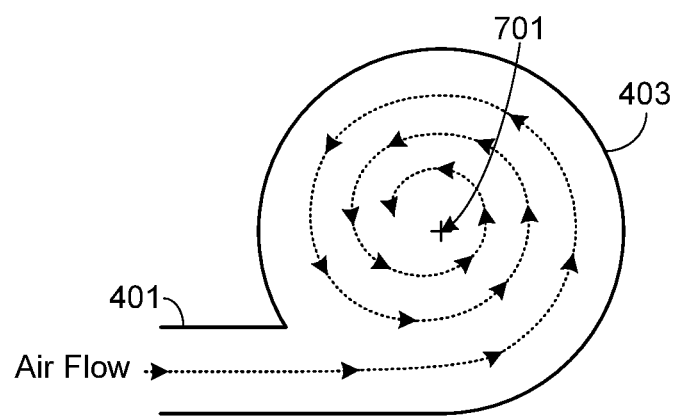
FIG. 8 illustrates a circular cross-sectional shape for a vortex generator in accordance with the invention, where the air intake is located at the bottom of the generator.
Figure 9:
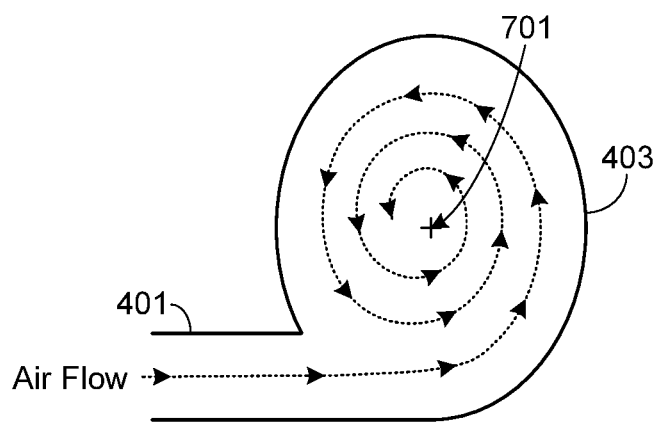
FIG. 9 illustrates an elliptical cross-sectional shape for a vortex generator in accordance with the invention, where the air intake is located at the bottom of the generator.
Figure 10:
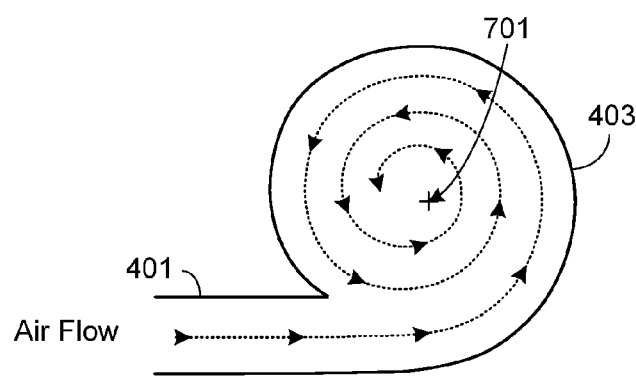
FIG. 10 illustrates a vortex generator in which the cross-sectional shape is defined by an involute of a conic and where the air intake is located at the bottom of the generator.

Vortex generator 403 is comprised of an elongated duct with an inside surface that is smooth, continuous, and free of holes, breaks or steps. Preferably the cross-section of the elongated duct is conic; for example the cross-section may be circular as illustrated in FIGS. 7 and 8 or elliptical as illustrated in FIG. 9. Alternately and as illustrated in FIG. 10, the cross-section of the elongated duct may be defined as the involute of a conic, e.g., the involute of a circle or an ellipse.

The vortex is formed by introducing air, via inlet 401, near the top (e.g., FIG. 7) or the bottom (e.g., FIG. 8) of the vortex generator. If the flow is introduced near the top, as shown in FIG. 7, then a vortex structure with a negative vorticity (i.e., clockwise flow rotation) is formed, while if the flow is introduced near the bottom, as shown in FIG. 8, then a vortex structure with a positive vorticity (i.e., counter-clockwise flow rotation) is formed. By generating a vortex, a lower pressure zone is produced along the axial centerline 701 of the vortex generator, thereby preventing flow separation and allowing a very small air intake (i.e., a small cross-sectional area) with a high aspect ratio to effectively provide the necessary air flow into a heat exchanger with a much larger inlet surface area and a small aspect ratio.

Figure 11:
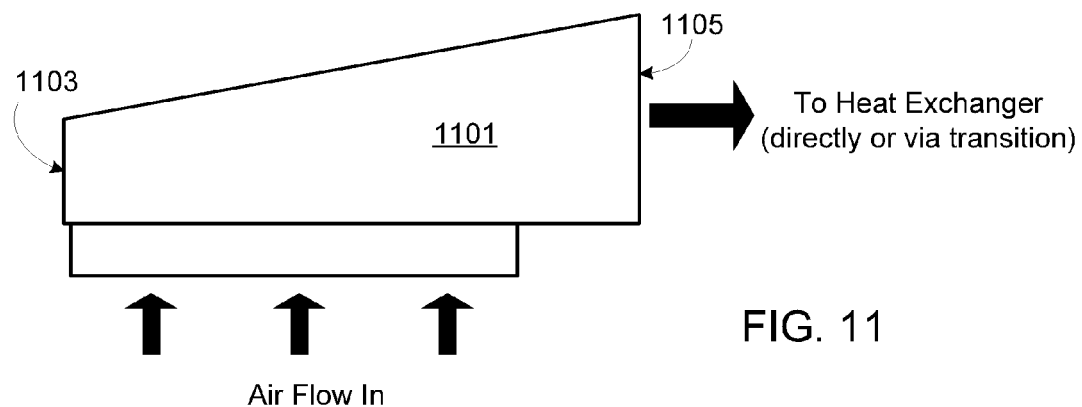
FIG. 11 provides a top view of a vortex generator in which the cross-sectional area increases along its length.
Figure 12:
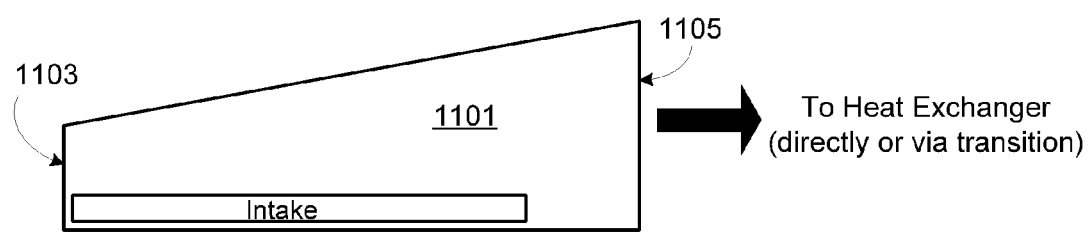
FIG. 12 provides a front view of the vortex generator shown in FIG. 11.

While the vortex generator of the invention may maintain a uniform cross-section throughout its entire length (e.g., a cylindrical shape), preferably the cross-sectional area of the generator increases along its length (e.g., a cone shape) towards the generator's outlet. Note that if the cross-sectional area of the generator is non-uniform, the cross-sectional area must increase, not decrease, going from the closed end to the outlet. FIGS. 11 and 12 provide top and front views, respectively, of an exemplary vortex generator 1101 with a non-uniform cross-sectional area. As shown, the cross-sectional area, $A_1$, of the closed end surface 1103 is smaller than the cross-sectional area, $A_2$, of the generator's outlet 1105. The inventor has found that in order to maintain the desired level of performance, the rate of growth of the cross-sectional area of the generator should be less than 3.6r $mm^2/mm$, where r equals the cross-sectional radius of the outlet.

Figure 13:
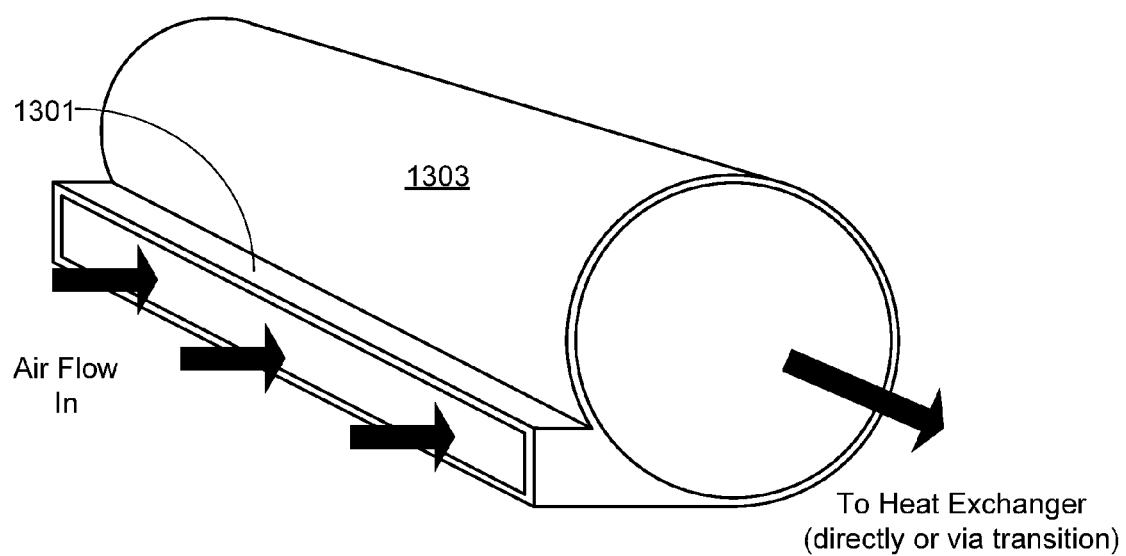
FIG. 13 provides a perspective view of a vortex generator in which the cross-sectional area increases along its length, and in which the air intake extends across the full length of the generator.
Figure 14:
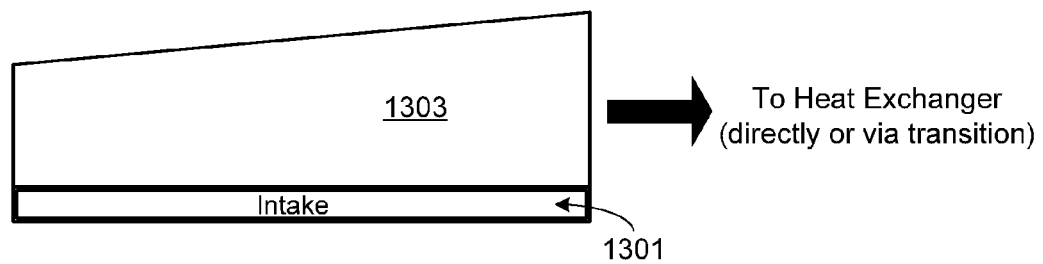
FIG. 14 provides a front view of the vortex generator shown in FIG. 13.
Figure 15:
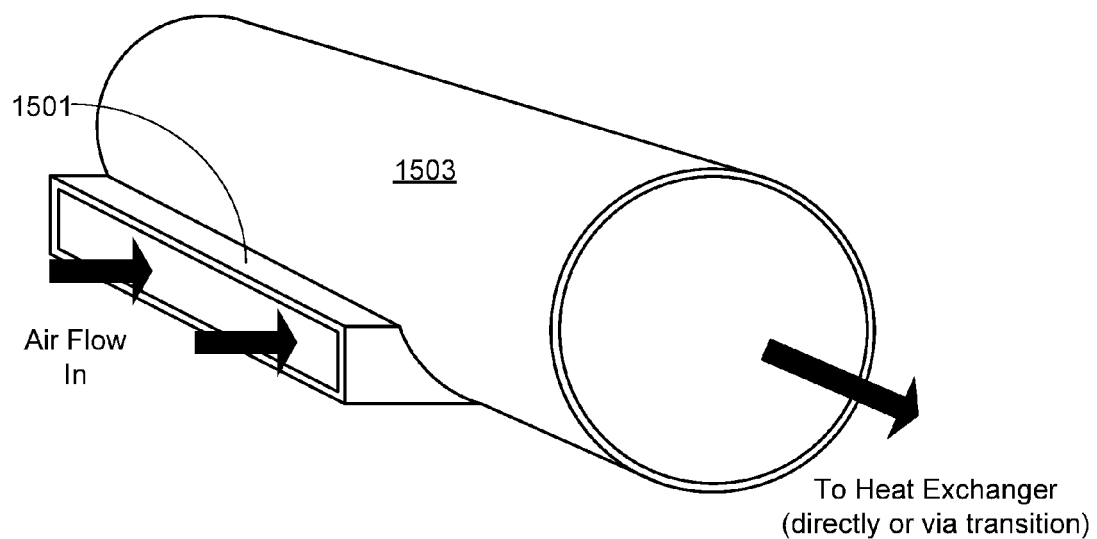
FIG. 15 provides a perspective view of a vortex generator similar to that shown in FIGS. 13 and 14, except that the air intake only partially extends across the length of the generator.
Figure 16:
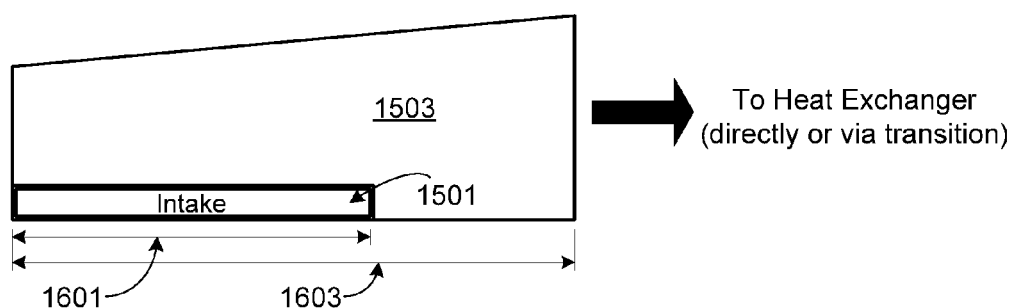
FIG. 16 provides a front view of the vortex generator shown in FIG. 15.

The configuration of the vortex generator as well as the inlet and transition ducting, if transition ducting is used, may be varied in order to accommodate a wide range of vehicle designs, all while maintaining the benefits of the invention. For example, in addition to the preferred configuration in which an air intake 1301 runs the full length of the vortex generator 1303 as shown in FIGS. 13 and 14, a smaller inlet 1501 that only spans a portion of the vortex generator 1503 may be used as illustrated in FIGS. 15 and 16. If the length 1601 of air intake 1501 is smaller than the full length 1603 of generator 1503, the inventor has found that an effective system requires that the ratio be greater than 0.25, i.e., the length of the air intake should be at least 25% of the length of the generator. Preferably the ratio of the length 1601 of air intake 1501 to the length 1603 of the generator is 0.50 or greater, and more preferably the ratio is 0.75 or greater.

Figure 17:
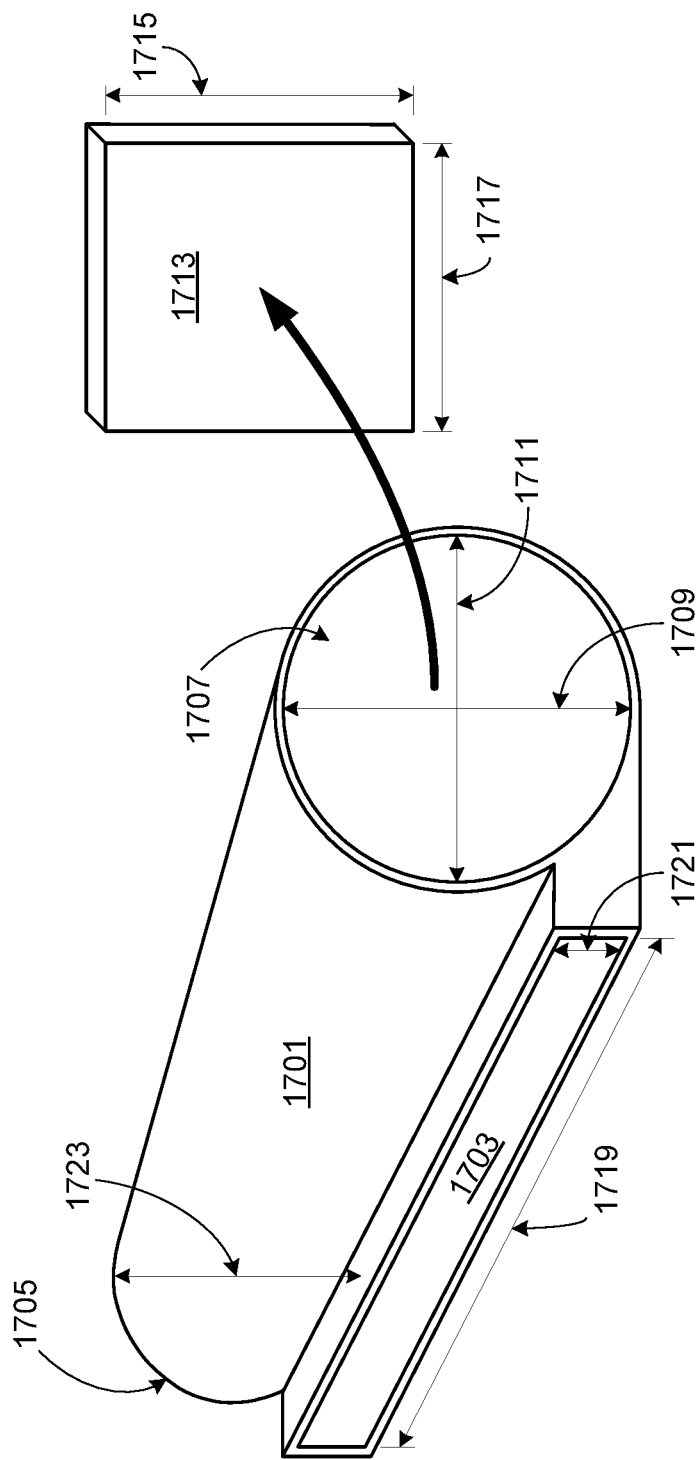
FIG. 17 illustrates many of the design parameters utilized in a heat exchanger air flow system configured in accordance with the invention.

FIG. 17 illustrates some of the other system parameters that may be varied to accommodate different vehicle designs, along with permissible values for these parameters in accordance with the invention. Although not required, for purposes of this example the illustrated vortex generator 1701 utilizes an air intake 1703 that runs the full length of the vortex generator. Furthermore, in this exemplary configuration the vortex generator 1701 has a circular cross-section with an increasing cross-sectional area going from the closed end 1705 to the outlet 1707. Outlet 1707 has a height 1709 and a width 1711. Due to the circular cross-section, height 1709 is equivalent to width 1711 in this exemplary configuration, however as previously noted the vortex generator may utilize other shapes in which the height and width would not be equivalent. The outlet of vortex generator 1701 is coupled, either directly or via a transition duct (not shown) to a heat exchanger 1713. It will be appreciated that heat exchanger 1713 may represent a single heat exchanger or several heat exchangers in a stacking arrangement, i.e., one heat exchanger positioned after another in the form of a stack. Heat exchanger 1713 has a height 1715 and a width 1717.

Figure 18:
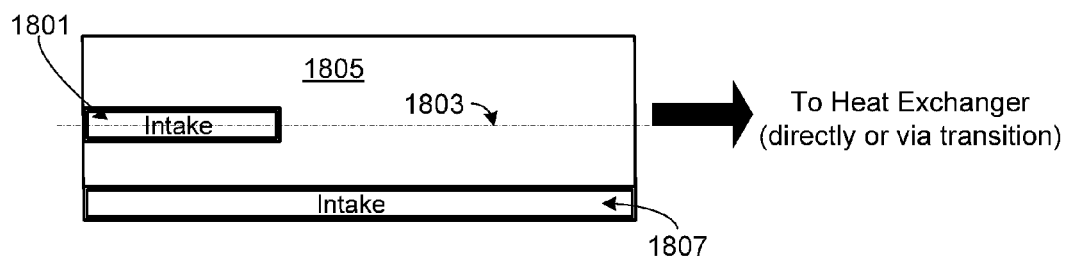
FIG. 18 provides a front view of a vortex generator with a uniform circular cross-section and which includes a secondary air intake.
Figure 19:
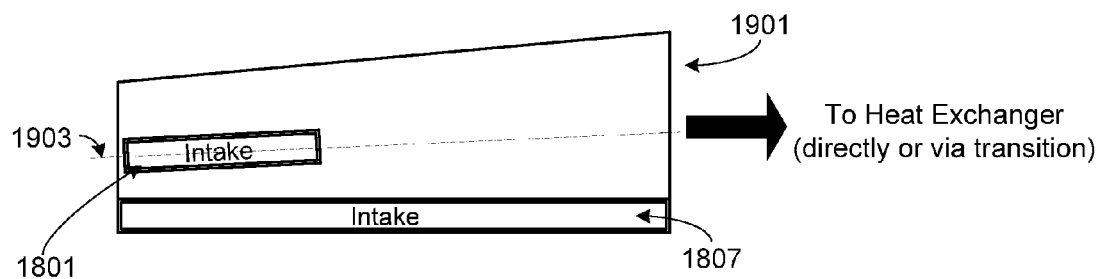
FIG. 19 provides a front view of a vortex generator similar to that shown in FIG. 18, except that the cross-section is non-uniform, i.e., the cross-sectional area of the vortex generator increases along its length.

In accordance with the invention, the area of inlet 1703 is much smaller than the area of outlet 1707. Preferably the area of outlet 1707 is at least 3 times the area of inlet 1703; more preferably at least 4 times the area of inlet 1703; still more preferably at least 5 times the area of inlet 1703; and yet still more preferably at least 6 times the area of inlet 1703. It should be understood that if the vortex generator uses multiple outlets as illustrated in FIG. 6 and subsequent embodiments, or multiple inputs as illustrated in FIGS. 18 and 19 below, then the total outlet area is preferably at least 3 times the total inlet area; more preferably at least 4 times the total inlet area; still more preferably at least 5 times the total inlet area; and yet still more preferably at least 6 times the total inlet area.

Furthermore, and in accordance with the invention, the aspect ratio of each outlet of the vortex generator (e.g., width 1711/height 1709 of outlet 1707) is preferably in the range of 1:1-1:2 relative to the aspect ratio of the corresponding heat exchanger (e.g., width 1717/height 1715 of heat exchanger 1713); and more preferably the aspect ratio of each outlet of the vortex generator should be approximately the same as the aspect ratio of the corresponding heat exchanger. Furthermore, the aspect ratio (i.e., length 1719/height 1721) of inlet 1703 of vortex generator 1701 is preferably much larger than the aspect ratio (i.e., width 1711/height 1709) of the outlet 1707. Additionally, the aspect ratio of inlet 1703 is preferably at least 4 to 1; more preferably at least 8 to 1; still more preferably at least 12 to 1; and yet still more preferably at least 16 to 1. Furthermore, in accordance with the invention, the ratio of the inlet height 1721 to the outlet height 1709 should be less than 0.5. In vortex generators utilizing a non-uniform cross-section along the length of the generator, such as the vortex generator shown in FIG. 17, the ratio of the inlet height 1721 to the height of the generator should, on average, be less than 0.5 where the maximum height of the generator is given at the outlet of the generator, i.e., height 1709, and the minimum height of the generator is given at the closed end of the generator, i.e., height 1723.

In addition to varying the length of the intake as a means of increasing air flow, a secondary air intake may be added that allows air to be injected directly into the core of the vortex. Preferably the secondary inlet is located at or near the generator's axial centerline. FIGS. 18 and 19 show two configurations for the secondary inlet, although it should be understood that these are simply exemplary configurations and the inventor envisions other configurations. The vortex generator shown in FIG. 18 has a uniform cross-sectional area throughout its length while the vortex generator shown in FIG. 19 has a non-uniform cross-sectional area in which the diameter increases along the length of the generator, and in which the largest diameter is proximate the generator's outlet 1901 as required by the invention. In both embodiments, the secondary inlet 1801 is aligned with the axial centerline of the generator (i.e., axial centerline 1803 in FIG. 18 and axial centerline 1903 in FIG. 19). In vortex generator 1805 the secondary inlet 1801 is parallel to primary inlet 1807. In the configuration shown in FIG. 19, due to the increasing cross-sectional diameter of the generator, secondary inlet 1801 is not parallel with primary inlet 1807. Note that since the secondary inlet is added as a means of increasing air flow, in configurations using a secondary inlet preferably the primary inlet runs the full length of the generator as shown in both FIGS. 18 and 19. Additionally, it is preferable that the secondary inlet, assuming it does not run the full length of the generator, is located near the closed end of the generator, and opposite the outlet, as illustrated in FIGS. 18 and 19.

Figure 20:
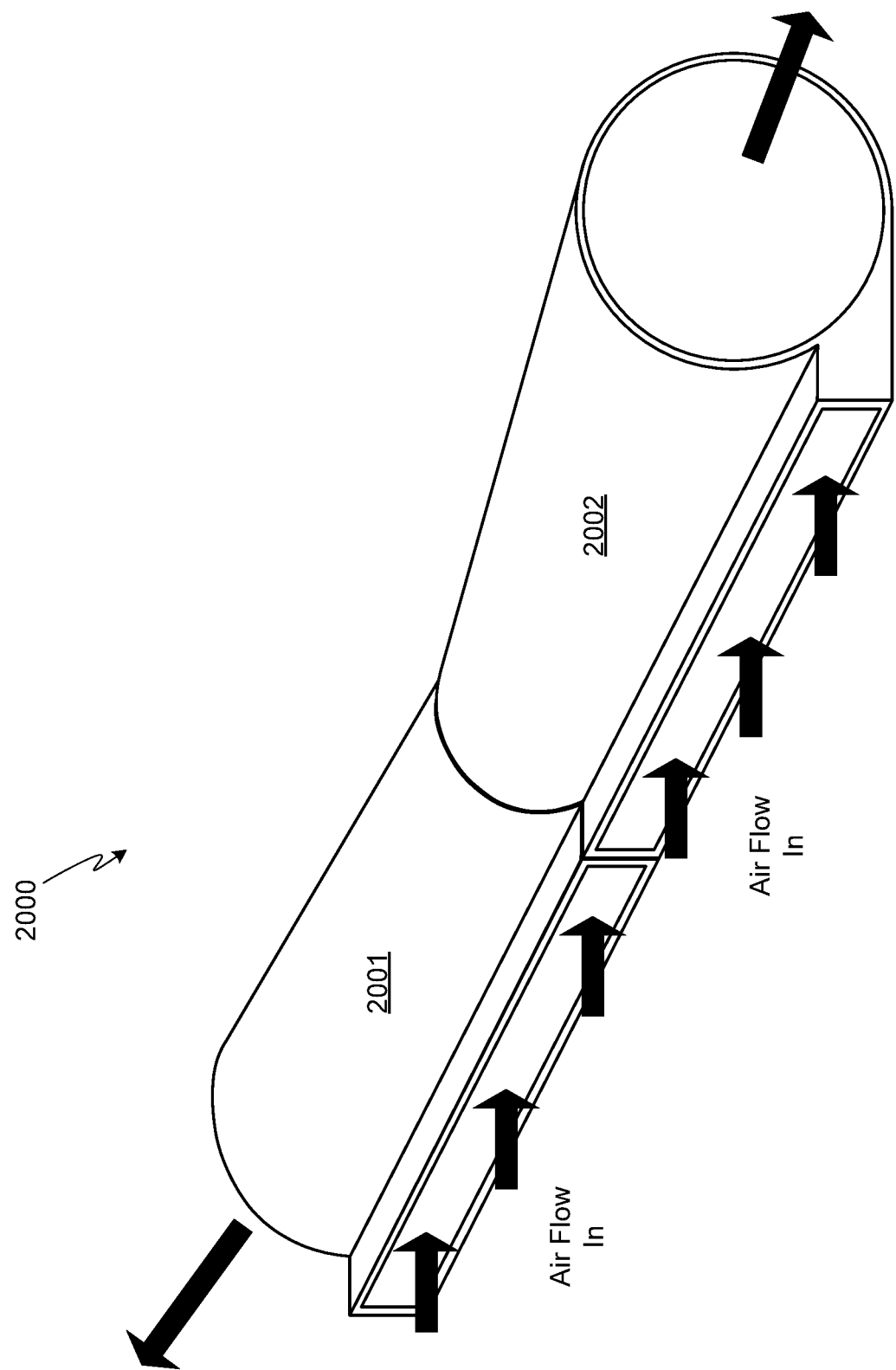
FIG. 20 provides a perspective view of a preferred embodiment of the invention utilizing a pair of vortex generators.
Figure 21:
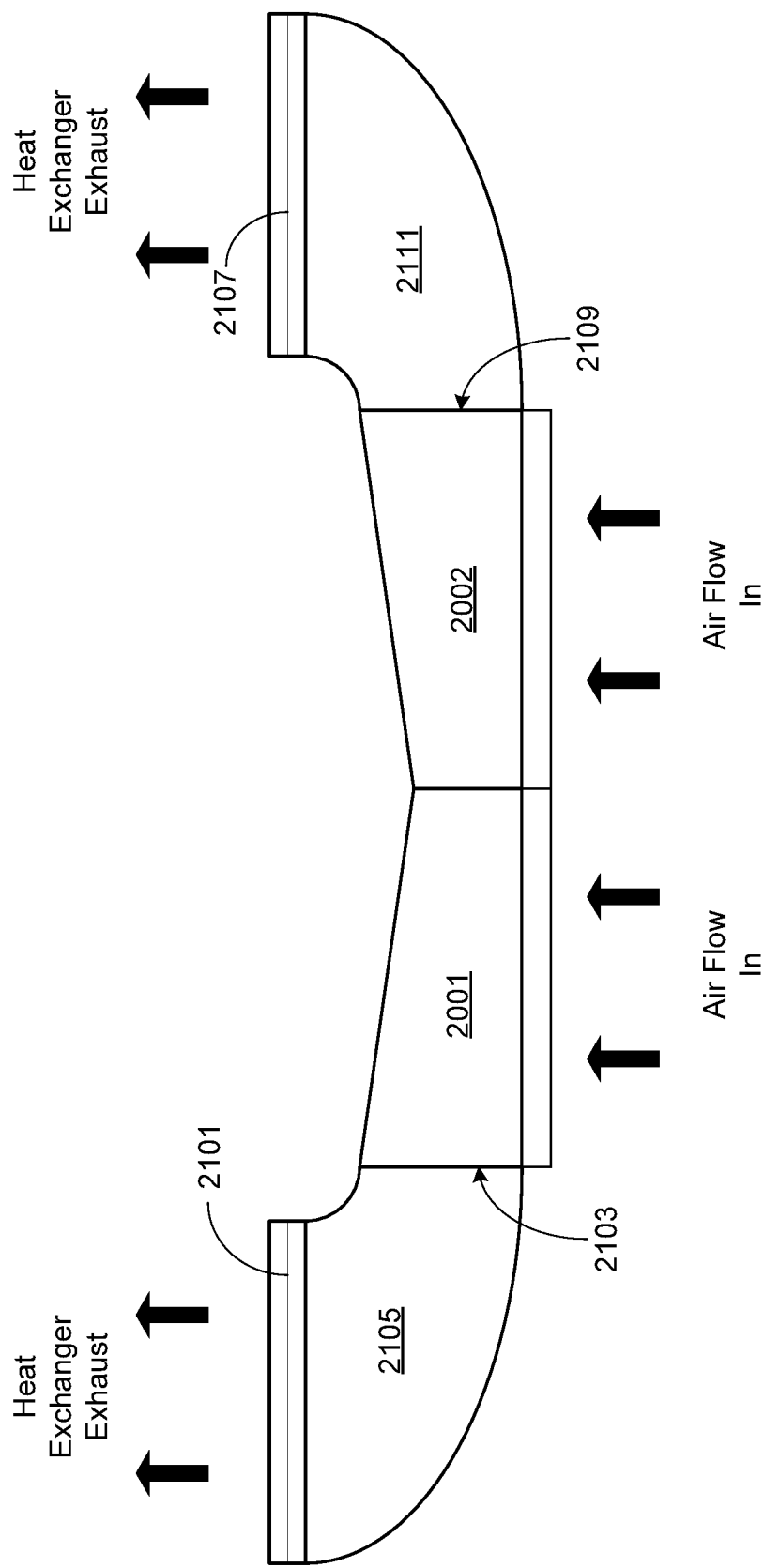
FIG. 21 provides a front view of the vortex generator system shown in FIG. 20.
Figure 22:
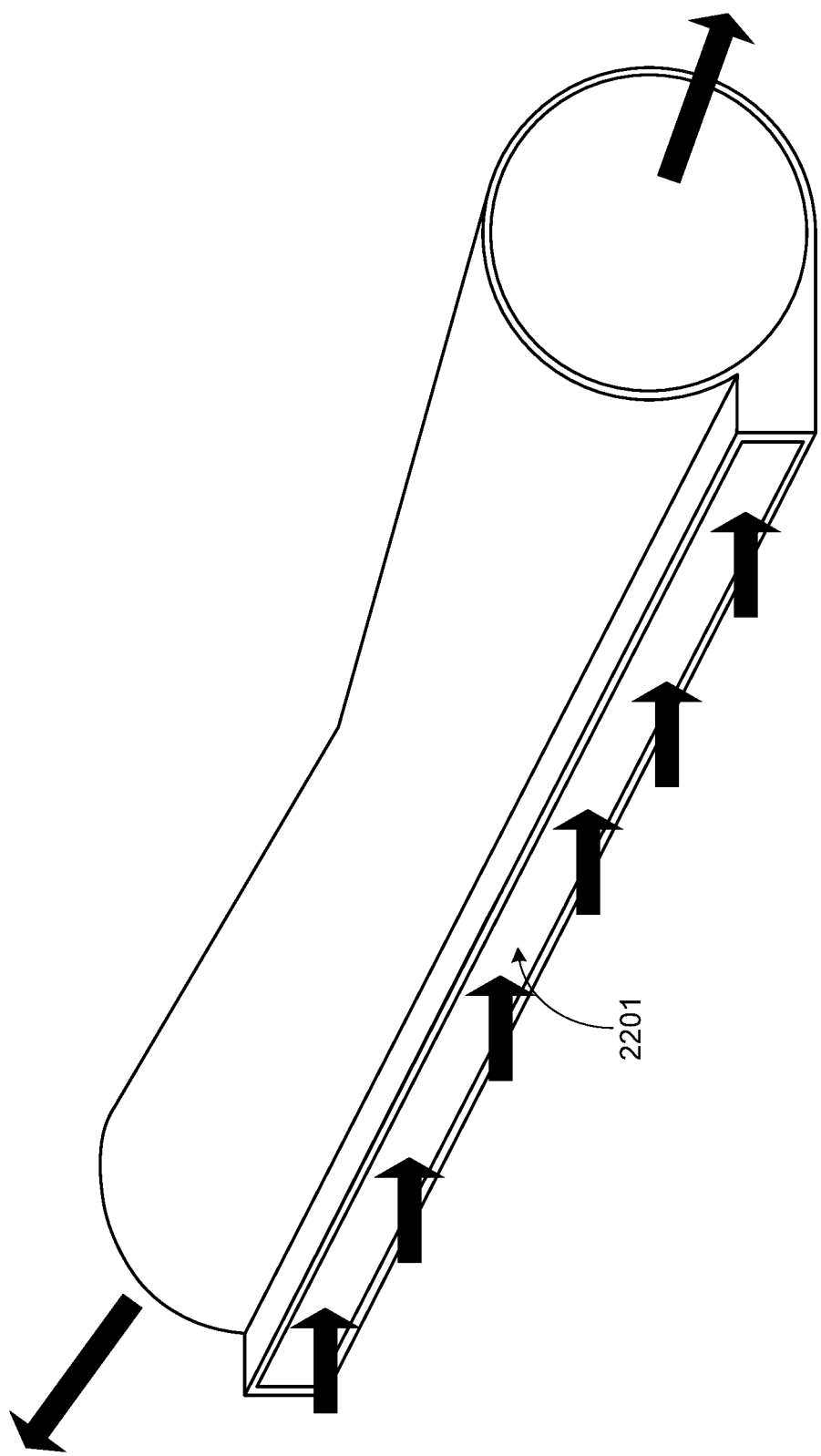
FIG. 22 provides a perspective view of an embodiment similar to that shown in FIGS. 20 and 21, except that the two vortex generators are fabricated as a single unit.
Figure 23:
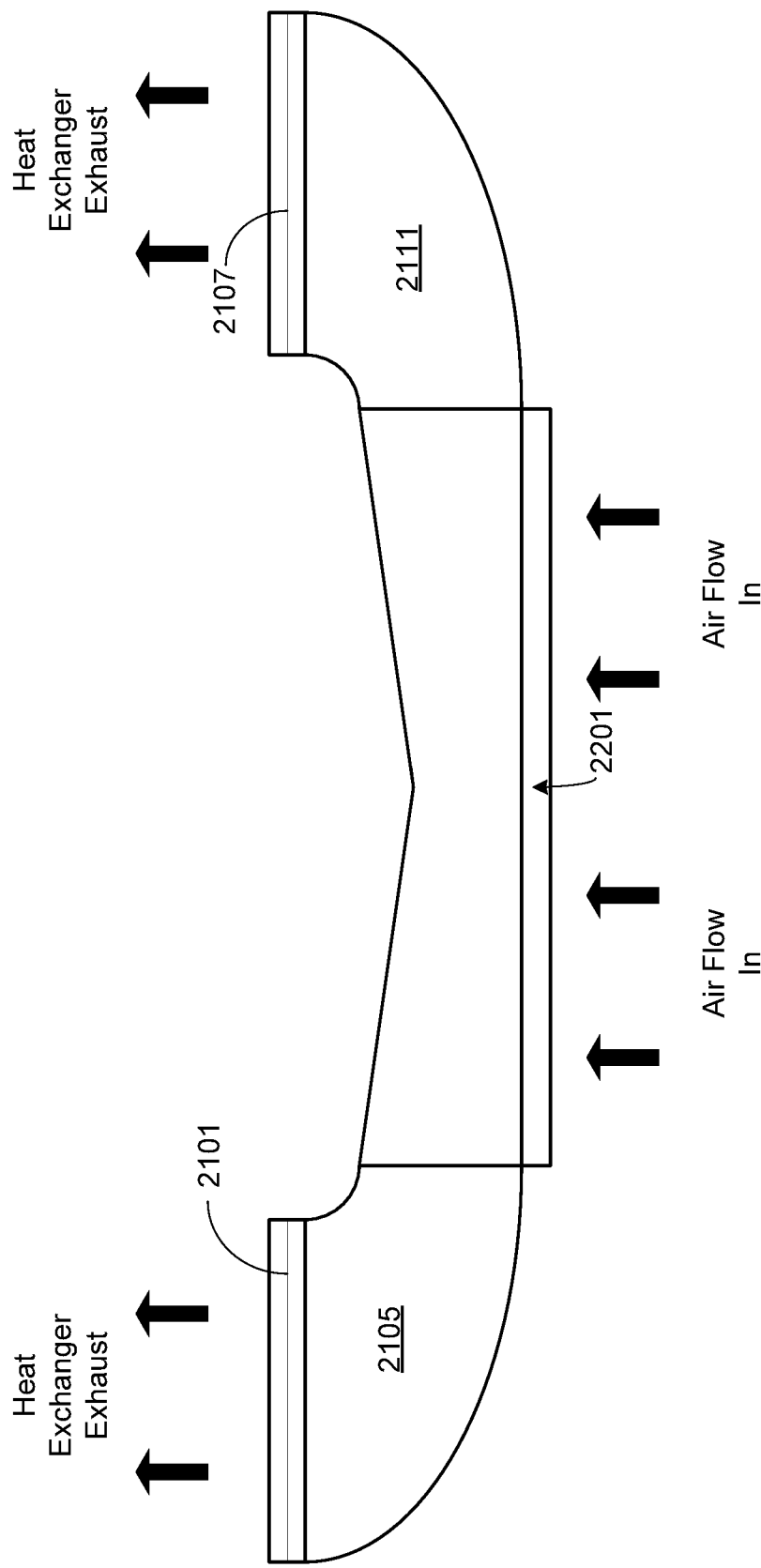
FIG. 23 provides a front view of the vortex generator shown in FIG. 22.

FIG. 20 illustrates a preferred embodiment of the invention. System 2000 uses a pair of vortex generators 2001/2002. The two vortex generators utilize a configuration in which the cross-sectional diameter increases along the length of each generator, and oriented such that the largest diameter of each generator is proximate to each generator's outlet. FIG. 21, which provides a top view of vortex generators 2001 and 2002, shows a heat exchanger 2101 coupled to outlet 2103 of generator 2001 via transition duct 2105, and a heat exchanger 2107 coupled to outlet 2109 of generator 2002 via transition duct 2111. FIGS. 22 and 23 illustrate a similar configuration, except that the two vortex generators are fabricated as a single unit. As a result, a single inlet 2201 is coupled to both the left and right portions of the vortex generator.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An automotive airflow system comprising:
   a vortex generator, said vortex generator comprising:
      an elongated duct defining an axial centerline;
      a primary inlet and at least one outlet, wherein a first outlet of said at least one outlet corresponds to a first end of said elongated duct, wherein said primary inlet is elongated and defined by a primary inlet length and a primary inlet height, wherein a first axis corresponding to said primary inlet length is parallel with said axial centerline of said vortex generator, wherein ambient air flows into said vortex generator through said primary inlet; and
   at least one automotive heat exchanger, wherein said ambient air flows out of said vortex generator through said at least one outlet and into said at least one automotive heat exchanger.

2. The automotive airflow system of claim 1, wherein a first cross-sectional area corresponding to a total cross-sectional area of said at least one outlet is at least 3 times larger than a second cross-sectional area corresponding to said primary inlet.

3. The automotive airflow system of claim 2, wherein said first cross-sectional area corresponding to said total cross-sectional area of said at least one outlet is at least 4 times larger than said second cross-sectional area corresponding to said primary inlet.

4. The automotive airflow system of claim 3, wherein said first cross-sectional area corresponding to said total cross-sectional area of said at least one outlet is at least 5 times larger than said second cross-sectional area corresponding to said primary inlet.

5. The automotive airflow system of claim 4, wherein said first cross-sectional area corresponding to said total cross-sectional area of said at least one outlet is at least 6 times larger than said second cross-sectional area corresponding to said primary inlet.

6. The automotive airflow system of claim 1, wherein an aspect ratio corresponding to said primary inlet is at least 4:1, where said aspect ratio is defined as a ratio of said primary inlet length to said primary inlet height.

7. The automotive airflow system of claim 6, wherein said aspect ratio corresponding to said primary inlet is at least 8 to 1.

8. The automotive airflow system of claim 7, wherein said aspect ratio corresponding to said primary inlet is at least 12 to 1.

9. The automotive airflow system of claim 8, wherein said aspect ratio corresponding to said primary inlet is at least 16 to 1.

10. The automotive airflow system of claim 1, wherein an aspect ratio corresponding to each outlet of said at least one outlet is in the range of 1:1 to 1:2, where said aspect ratio is defined as a ratio of an outlet width to an outlet height.

11. The automotive airflow system of claim 1, wherein a first aspect ratio corresponding to each outlet of said at least one outlet relative to a second aspect ratio corresponding to each heat exchanger of said at least one heat exchanger is in the range of 1:1 to 1:2, wherein said first aspect ratio is defined as a ratio of an outlet width to an outlet height, and wherein said second aspect ratio is defined as a ratio of a heat exchanger width to a heat exchanger height.

12. The automotive airflow system of claim 1, wherein an average ratio of said primary inlet height to an outlet height is 0.5 or less.

13. The automotive airflow system of claim 1, said vortex generator further comprising a secondary inlet aligned with said axial centerline, wherein ambient air passing through said secondary inlet is injected directly into a core of said vortex generator.

14. The automotive airflow system of claim 1, wherein said primary inlet is coupled to said elongated duct along an upper surface of said elongated duct.

15. The automotive airflow system of claim 1, wherein said primary inlet is coupled to said elongated duct along a lower surface of said elongated duct.

16. The automotive airflow system of claim 1, wherein a ratio of said primary inlet length to a duct length corresponding to said elongated duct is at least 0.25.

17. The automotive airflow system of claim 16, wherein a ratio of said primary inlet length to a duct length corresponding to said elongated duct is at least 0.50.

18. The automotive airflow system of claim 17, wherein a ratio of said primary inlet length to a duct length corresponding to said elongated duct is at least 0.75.

19. The automotive airflow system of claim 1, wherein said elongated duct comprising said vortex generator has a conic cross-section.

20. The automotive airflow system of claim 19, wherein said conic cross-section is circular.

21. The automotive airflow system of claim 19, wherein said conic cross-section is elliptical.

22. The automotive airflow system of claim 1, wherein a cross-section corresponding to said elongated duct of said vortex generator is defined by an involute of a conic.

23. The automotive airflow system of claim 1, wherein a cross-section corresponding to said elongated duct of said vortex generator is uniform throughout said elongated duct.

24. The automotive airflow system of claim 23, said vortex generator further comprising a second outlet of said at least one outlet, wherein said second outlet corresponds to a second end of said elongated duct, wherein said first outlet is distal from said second outlet, wherein said ambient air flows into said vortex generator through said primary inlet, and wherein said ambient air flows out of said vortex generator through said first outlet and into a first heat exchanger of said at least one automotive heat exchanger and flows out of said vortex generator through said second outlet and into a second heat exchanger of said at least one automotive heat exchanger.

25. The automotive airflow system of claim 1, wherein a cross-section corresponding to said elongated duct of said vortex generator is non-uniform throughout said elongated duct.

26. The automotive airflow system of claim 25, wherein a second end of said elongated duct is closed, wherein said second end is distal from said first outlet, and wherein a first cross-sectional area corresponding to said second end is smaller than a second cross-sectional area corresponding to said first outlet.

27. The automotive airflow system of claim 26, wherein a rate of growth between said first cross-sectional area and said second cross-sectional area is 3.6r mm$^2$/mm or less, where r equals a radius corresponding to said first outlet.

28. The automotive airflow system of claim 25, said vortex generator further comprising a second outlet of said at least one outlet, wherein said second outlet corresponds to a second end of said elongated duct, wherein said first outlet is distal from said second outlet, wherein said ambient air flows into said vortex generator through said primary inlet, and wherein said ambient air flows out of said vortex generator through said first outlet and into a first heat exchanger of said at least one automotive heat exchanger and flows out of said vortex generator through said second outlet and into a second heat exchanger of said at least one automotive heat exchanger, wherein a first cross-sectional area corresponding to a cross-section of said elongated duct midway between said first outlet and said second outlet is smaller than a second cross-sectional area corresponding to said first outlet, and wherein said first cross-sectional area is smaller than a third cross-sectional area corresponding to said second outlet.

29. The automotive airflow system of claim 1, further comprising at least one transition duct coupling said at least one outlet of said vortex generator to said at least one automotive heat exchanger.

* * * * *